C. KROGH.
Grain-Drill.
No. 48,566.
Patented July 4. 1865.
Fig. 1.
Fig. 2.
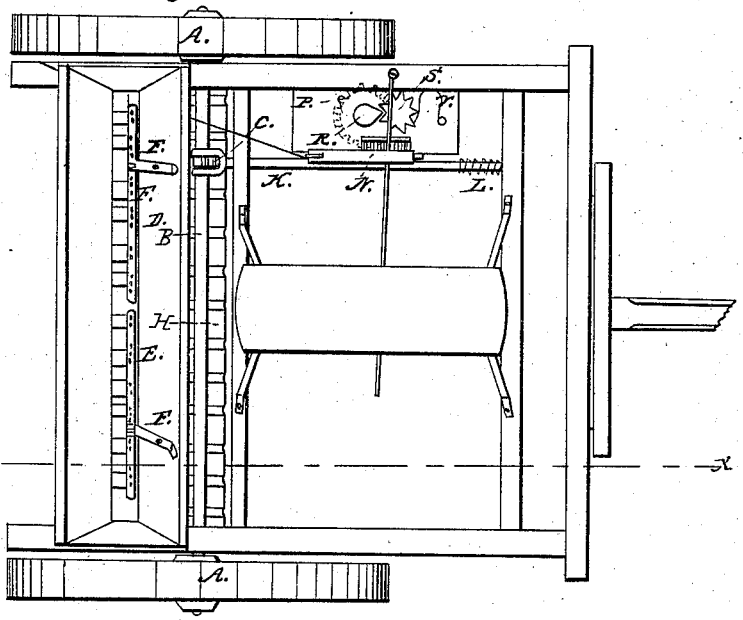
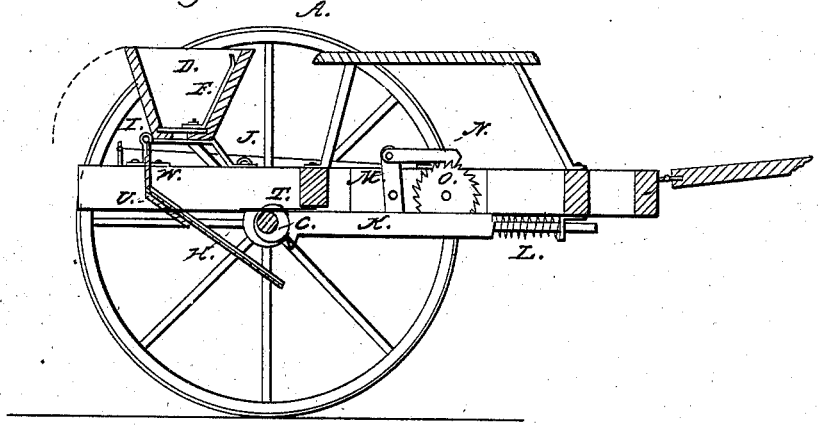
Fig. 3. Fig. 4.
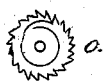 
Witnesses:
Always J. Snow
Chas. E. Baker
Inventor:
Casper Krogh
by Coburn & Snow
attorneys.

UNITED STATES PATENT OFFICE.

CASPER KROGH, OF KROGHVILLE, WISCONSIN.

IMPROVEMENT IN SEEDING-MACHINES.

Specification forming part of Letters Patent No. 48,566, dated July 4, 1865.

*To all whom it may concern:*

Be it known that I, CASPER KROGH, of Kroghville, in the county of Jefferson and State of Wisconsin, have made a new and useful Improvement in Seed-Sowers; and I do hereby declare that the following is a full, clear, and exact description of the same, reference being had to the accompanying drawings and letters of reference marked thereon, which form a part of this specification, in which—

Figure 1 represents a top view of my invention; Fig. 2, a side elevation of section at the red line $x$ in Fig. 1, and Figs. 3 and 4 detached views of two wheels used in measuring the land.

The nature of my invention consists in the method of regulating the feed in the bottom of the seed-box; also, of the method of attaching the seed-box to the frame, and in the method in which the seed is distributed after falling from the seed-box, and in attaching to the machine a land-measurer to determine how much land is being sown.

To enable those skilled in the art to manufacture and use my invention, I will proceed to describe the same with particularity.

A represents the wheels, which are any ordinary wheels, and B the shaft.

D is the seed-box, which is of the ordinary size and shape, having in the bottom the usual openings for the seed to pass out of. There are also in the seed-box the slides E E, to which covers for the openings are attached, being adjustable, so that they can be so attached to the slides E E that every alternate opening can be open while the others are closed; or they can be so arranged that only one in each end of the seed-box will be open while the rest are closed. The object of this is to adapt it to sowing different kinds of seeds.

The levers F are so connected with the slides E as to move them into whatever position the operator desires. Thus the opening and closing the holes in the bottom of the seed-box may be effected simply by the operator using the levers F.

The seed-box rests upon the hinges I and the front straps, which are held down by means of a pin through the staple J. By removing the pin the box D can be turned on the hinges I and readily emptied of its contents. This is convenient in case there is a surplus of seed after sowing, or when it is desirable to dust out the box. There is a corrugated board, made either of wood or metal, placed under the seed-box, for the grain to fall onto it as it comes from the seed-box. Said board is attached to a board, U, which extends across the machine, with its ends fitted into oblique grooves in the side pieces thereof, or otherwise so connected therewith as to admit of being slid up and down, so as to extend the corrugated board H more or less forward to suit the object of the operator. There is also a perpendicular back board, W, connected with the slide-board U, and extending up high enough to prevent the grain as it falls from the grain-box from being blown over behind the corrugated board H. There are as many furrows in the board H as there are apertures or openings in the bottom of the seed-box, and they are so arranged as to be directly under said openings. The corrugated board H is made movable, so that by using the ordinary hoes or tubes of a drill the furrows can be brought to the top of said tubes, so as to carry the grain into them, and the machine used as a drill; or the board H can be slid down in front of said tubes, so that the grain will fall directly from the furrows thereof to the ground, sowing the seed broadcast. If the seed should not be sufficiently scattered in falling from the furrows to the ground, there might be some small pins put in the board at the lower end of the furrows for the grain to strike against just as it shoots from the furrows, which would cause it to scatter. The furrows in the board H keep the seed from sliding obliquely on the board in case the machine is driven on a side hill or on uneven ground.

On the axle B there is an eccentric, C, against which the end of the bar K rests, the said bar being held in place by means of the lever M, which is attached to the side piece of the machine, and by the plate T, which is attached to the bar and extends over the axle. The said bar is kept pressed against the eccentric by means of the coil-spring L. At each revolution of the wheels of the machine, which are made to turn the axle, the eccentric C moves the bar K forward and the coil-spring L throws it back again. At each vibration of the bar K the lever M, the lower end of which is attached to said bar, is caused to vibrate, and and it in turn throws the catch N forward one notch in the wheel O and turns said wheel just the width of the notch.

On the inside of the wheel O, attached to said wheel, there is a scroll hook or catch or its equivalent, which, at each entire revolution of the wheel O, catches over one cog on the wheel P, said wheel P being placed at right angles to the wheel O and at such a distance from it that the cogs on the former mesh into the scroll-hook on the side of the latter, so that at each entire revolution of the wheel O the wheel P is turned the width of one cog.

Through the center of the wheel P there is a shaft, which turns with the wheel, and on the top of which is placed the index-pointer R; and there is also a star-wheel, S, which is so arranged in relation to the index R as to be turned by it one notch each time it makes a complete revolution. The star-wheel S is regulated in its motion and kept steadily in place by the spring V. Thus it is seen that by indexing these various wheels the number of revolutions of the wheels A are shown, and by knowing the width that the machine sows the quantity of land sown is at once told; or the proportions of the land-measurer may be made such that the indexes thereon may indicate the land sown in rods and acres.

Having thus fully described the construction and operation of my invention, what I claim as mine, and desire to secure by Letters Patent, is—

The arrangement of the adjustable corrugated apron H beneath the hopper of a grain-drill, substantially as and for the purposes herein shown and specified.

CASPER KROGH.

Witnesses:
   ALEXR. McCRACKEN,
   ROBT. McCRACKEN.